United States Patent Office 3,151,995
Patented Oct. 6, 1964

3,151,995
PROCESS FOR INHIBITING THE SETTING OF CEMENTITIOUS COMPOSITIONS
John L. Nemeth, 349 Arnold Ave., Perth Amboy, N.J.
No Drawing. Filed Dec. 19, 1960, Ser. No. 76,462
10 Claims. (Cl. 106—89)

This invention relates to a novel process for temporarily inhibiting the setting of a wet-mix hydraulic cementitious composition and particularly to such a process in which Portland cement is the cementing ingredient. The term "cementitious composition" as used herein includes concretes, mortars and grouts. Concrete is essentially an artificially made conglomerate of fragments of coarse aggregate, such as gravel, crushed rock, slag or other chemically inert material embedded in a matrix of sand, water and cement. Similarly, a mortar is a mixture of cement, water and a fine aggregate such as sand and particulated stone or slag. A grout is usually defined as a neat cement paste, a mixture of cement and water having at the time of initial mixing a creamy consistency, although the term is also applicable to a fluid mortar. The cement-water paste or grout is the bonding constituent of mortars and concretes and the constituent that undergoes chemical reaction to produce hardening or set of the initially fluid or plastic mix.

Hydraulic cements include those cements that are capable of setting and hardening under water by virtue of the interaction of the water with the constituents of the cement. The term "Portland cement" refers to a class of hydraulic cements the essential constituents of which are two calcium silicates, $3CaO.SiO_2$ and $2CaO.SiO_2$. The alumina and iron of the raw materials form for the most part $3CaO.Al_2O_3$ and solid solution approximating the composition $4CaO.Al_2O_3.Fe_2O_3$, or an undercooled liquid or glass of similar composition. Other impurities are present in small amounts. Portland cements are made by heating a mixture of calcareous material and argillaceous material to partial fusion, sometimes adding iron ore or silica. The clinker is pulverized with some form of calcium sulfate, such as gypsum, to give about 2 percent $SO_3$ in the cement. Small amounts of other materials may be added during the grinding to impart special properties to the resultant product.

Five types of Portland cement are recognized in the specification of the American Society for Testing Materials and of the Federal Specification Board. Reference is made to A.S.T.M. C150–47.

Upon addition of water to Portland cement, a cement-water paste is formed which under ordinary conditions gradually changes from the original consistency of a wet slurry, deformable under gravity, to a non-deformable, hard dry mass. "Initial set" and "final set" as used herein refer to arbitrary degrees of hardening and are measured conventionally by the resistance to indentation of rods of specified diameter and mass, the process being described in all standard specifications. It has been observed that the time of initial set corresponds to the time at which an exotherm develops, and the final set occurs when the temperature reaches a maximum.

The amount of water necessary to form a stiff, workable paste of neat cement is about 20 percent by weight of the cement; the normal range as specified in A.S.T.M. C187–44 is from 15–30 percent; this amount of water is substantially equal to the amount of water required to completely hydrate the cement. Although the amount of water combining with the cement is independent of any aggregate present, nevertheless when an aggregate is present the water required to insure adequate mobility increases with increments in aggregate, the relative increase depending on many factors including particle size, distribution of the aggregates and particle shape. Hence, a 1:3 Portland cement-sand mixture corresponding to a neat cement mixture of the like consistency requires approximately twice the weight of water, and a lean concrete mix requires about five times as much water as the neat cement mixture of equivalent consistency.

Ordinarily Portland cement compositions are supplied as dry mixes which are mixed at the field site with water or they are supplied as wet-mixes prepared in a central plant or in a truck mixer shortly before the time at which such mixes are to be used. It is mandatory that a wet hydraulic cementitious mix made according to prior art practices be used within a short time, ordinarily within a few hours, after the incorporation of water into the solids, because such a wet mix, although including retarders such as certain organic materials or gypsum, will harden or set before it is applied at the site for which it is intended. Many obstacles and disadvantages are inherent in such practice.

First of all there is no plant control over the ultimate fluid analysis of the cementitious composition when the wet-mix cannot be completely formulated at a processing plant because during the shipping and/or storage the composition would set to an unworkable heavy consistency, incapable of being poured. Where small quantities of cementitious compositions are to be used, the user may add water to the solids at the site of usage; where large quantities of cementitious compositions are required, such as a job calling for sufficient concrete to pour a foundation, the solids are conventionally placed in a mixing truck and shortly before arrival at the field site the driver of the vehicle adds the requisite water to the solids in the mixer. Such methods obviously fall very short of providing stringent quality control since the judgment of an individual, invariably not technically trained, determines the ultimate composition of the wet-mix. Therefore, no assurance can be given of the exact composition of the wet-mix. Since the ultimate physical properties of concretes and mortars produced from such wet cementitious mixes is dependent on the percentage of solids present therein, and since the workability of any mass requires the presence of liquid within a certain rather critical range, it is of utmost importance to those concerned with preparation and use of such mixes that the ultimate composition be subject to strict quantity control. Furthermore, it is well known that certain constituents in water have an important effect on the quality of hardened masses prepared therefrom. For example, it is well known that the presence of mineral acid salts is highly undesirable, their use resulting in masses of inferior hardness. Also, water of considerable hardness, i.e., water having high alkaline earth ion content, will frequently set too rapidly and cause unsatisfactory hardness of finished compositions. Often faulty jobs result because the operator adding water to the solids of a cementitious mix does not take into account the hardness of the water or the presence of mineral acid salts therein.

In addition to these difficulties, the storage life of a wet-mix is very limited because of the fact that once water is added to the solid components of a cementitious mix, the mix must be applied within a few hours before hardening sets. This occurs even when the mix is maintained under continuous agitation. Where such mixes are prepared in truck mixers it frequently happens that the vehicle is delayed in transit or is subject to motor or other failure and the wet-mix, although continuously agitated, will harden in the mixer. A very costly chipping or breaking process is required to remove the hardened cementitious composition.

Accordingly, it is a principal object of the instant invention to provide a method for the preparation of wet cementitious mixes, which method enables said wet-mixes to be stored for prolonged periods as slurries without setting or hardening.

It is another object of the invention to provide a method for the preparation of wet cementitious mixes, which method insures that the quality and quantity of the water present in the mix is strictly controlled.

Other objects will be apparent from the accompanying disclosure and examples set forth.

I have discovered that wet Portland cement mixes may be held for prolonged periods as workable slurries or pastes with negligible hardening or setting by storing the wet-mixes in slurry or paste form under reduced pressure for a period of time during which it is desired to inhibit the set of the wet mix.

Stated briefly, in accordance with the subject invention, a fluid, wet-mix Portland cement composition which will normally harden in several hours under atmospheric pressure at ambient temperature, is stored under vacuum below that at which the water content has appreciable vapor pressure and will boil off. The mix is stored in this manner for a time in excess of that at which hardening of the composition will be experienced at atmospheric pressure. Upon release of the vacuum after storage, the wet-mix will initially have substantially the same consistency and composition as the freshly prepared wet-mix and will harden and cure in generally the usual manner. Thus, I have been able to maintain Portland cement wet-mixes fluid and workable for as long as a year in this way without impairing the ability of the mix to harden upon release of the vacuum.

The presence of aggregate, coarse or fine, in my Portland cement wet-mix does not appear to effect the ability of the vacuum to inhibit the normal tendency of the wet Portland cement to loose its fluidity and harden. Therefore, my process is equally applicable to the treatment of commercial grouts, mortars and concretes based upon Portland cement.

The results I obtain by storing the cement mix under vacuum is surprising and unexpected in view of the fact that the hydraulic cement mixes I employ will normally harden within a few hours at atmospheric pressure, even when such mixes are continuously agitated under atmospheric pressure. Although I do not wish to be bound by any hypothesis, it is presently believed that in temporarily inhibiting the set of Portland cementitious compositions in the novel manner described, the solubility of the various calcium silicates in the systems is lowered, as a result of which such silicates fail to hydrate and crystallize, thereby causing hardening of the mass.

The process within the purview of my invention is applicable to a wide variety of hydraulic cementitious compositions containing Portland cement and is not restricted to any particular composition, or range of compositions. In practice such compositions as concrete, mortars and wet grouting mixtures vary considerably, inter alia, with cost requirements, availability of aggregates when used, and with the slump and strength requirements of the set composition. My process is beneficially applied to the aforementioned recognized types of Portland cement and is also useful when applied to certain low alumina cements. A typical chemical analysis of a low alumina cement is as follows: silicon dioxide, 23.8 percent; alumina, 3.2 percent; ferric oxide, 7.8 percent; calcium oxide, 62.0 percent; magnesium oxide, 0.9 percent; and sulfur trioxide, 1.3 percent. For best results the alumina content of the cement used in the practice of the invention should be no more than about 7.5 percent, based on the dry weight of the cement, and should preferably be less than about 6.5 percent.

While my wet-mix compositions contain Portland cement and water as essential ingredients, it will be distinctly understood that such compositions as described and claimed may include also such additives and admixtures as are conventionally used to give certain properties to the finished product, provided such additives do not affect the basic characteristics of my compositions, as by causing "flash set." Thus, for example, I may use sulfonated lignin products to improve upon the properties of the ultimate hardened product. As mentioned, my wet-mixes may contain the usual aggregates.

In putting my invention into practice, the vacuum may be applied to the cement prior to, simultaneously with, or immediately after the addition of water to the solids. I prefer to add the water to the solids while the solids are under vacuum although this is not essential to the realization of satisfactory results since the last-mentioned procedure will be satisfactory provided the freshly formulated wet-mix is evacuated before a characteristic exotherm, corresponding with so-called "initial set" develops. When used, aggregate is usually dry mixed with the cement before the addition of water. The vacuum may be applied and maintained on the system by means which will readily suggest themselves to those familiar with vacuum technology.

The capacity of the pump used to evacuate the system will depend, of course, on the volume of air that must be displaced in order to achieve an evacuated system. When the practices of the instant invention are applied to a conventional truckmixer, the existing apparatus may be easily modified to enable the mixing chamber to be evacuated as, for example, by reversing the air brakes of the vehicle to permit their use as an evacuating pump and connecting the pump thus made to the mixing chamber by conduits.

I mix my ingredients and store the wet-mix under vacuum at ambient temperatures, within the range of 50° F. to 100° F. The preferred temperature for mixing and vacuum storage is 70° F.

As for the amount of vacuum under which I maintain the wet-mix, it has been brought out above that the maximum vacuum must be below that at which water will evaporate or boil off from the mix. Obviously then, the maximum vacuum I may operate with is a function of temperature. Thus, in the case the temperature is 70° F., the absolute pressure on the slurry should exceed about 20 mm. Hg (740 mm. Hg vacuum, gage pressure). The treatment tends to lose some of its effectiveness at absolute pressures greater than about 560 mm. Hg (200 mm. Hg vacuum, gage pressure). Preferred conditions for the storage period is an absolute pressure within the range of about 60 mm. Hg to about 260 mm. Hg. By using an absolute pressure which is somewhat higher than the vapor pressure of the water at the ambient temperature, I preclude evaporation which might occur if the temperatures of the mass were to rise somewhat when freshly mixed.

I prefer to agitate the mix with a slow speed agitator while under the vacuum. The agitation provided by the conventional truck-mixers will suffice. Preferably I agitate the wet-mix during vacuum storage by subjecting it to vibration. The agitation can be continuous although I have obtained satisfactory results using intermittent agitation. The reason I prefer to agitate the evacuated wet-mix is that the physical properties of the ultimate hardened mix appear to be enhanced somewhat by such practice. However, agitation is not of the essence, insofar as maintaining the mix workable for prolonged periods, for I am able to inhibit set without agitation by maintaining the mix under vacuum.

The time during which the mix is maintained under the vacuum will depend on factors such as the distance from the formulating plant to the job site and requirement of the job. While my process has an application to the treatment of materials which are to be maintained fluid for only about 4 hours after the mix is formulated, its most practical application extends to maintaining wet-mixes fluid and workable for at least a day. As mentioned, the treatment may be maintained for a month or even a year or more.

When it is desired to permit the vacuum stored wet-mix to harden, the vacuum is released and preferably the wet slurry, which will still have a workable consistency, is mixed at atmospheric pressure with air to avoid bleeding of the mass during cure and otherwise to improve upon the strength of the cured mass. The poured wet-mix is then permitted to harden and cure in the usual manner.

The following examples are given to illustrate further this invention and are not, however, to be construed as limiting the scope thereof.

*Example I*

Experiments were conducted to compare the behavior of a typical commercial concrete composition when agitated under vacuum, in accordance with this invention, and when agitated at atmospheric pressure in accordance with the usual practice.

A control wet-mix was prepared by mixing water into the solids (cement and aggregate) in the usual manner at 70° F. and pouring the freshly prepared wet-mix into a form. The composition was as follows:

| | |
|---|---|
| Sand (clear, washed) pounds | 12 |
| Grit aggregate (⅜" min.) do | 12 |
| Portland cement—type I (6.43% alumina) do | 5 |
| Pozzalite [1] ounce | ½ |
| Water gallon | 1 |

[1] Pozzalite is a calcium salt of lignosulfonic acid.

The poured composition was hard after about 3 hours.

The same Portland cement concrete composition was prepared, in accordance with my invention, by adding water to the evacuated solids (cement and aggregate) in a 5-gallon glass jug. A Cemco Pressovac Pump, ¾ H.P. was used to evacuate the jug. The mixture was held for 125 hours under a pressure of 640 mm. Hg vacuum, gage pressure, as indicated by an open tube mercury manometer attached to the system. While under this vacuum the wet concrete mix was agitated for several minutes about every sixth hour during storage. 125 hours after the mix was prepared, the pump was stopped and the contents of the glass jug were inspected and found to have substantially the same consistency as the freshly prepared wet concrete mix. The mix was then mildly agitated at atmospheric pressure and poured. After about 5 hours, the concrete mix hardened.

When another sample of wet concrete mix, of the same formulation except excluding Pozzalite, was subjected to the same vacuum mixing and storage test, the same inhibition of setting was observed.

*Example II*

The process of Example I was applied to a mortor mix based on Portland cement. The composition of the mortar was as follows:

| | |
|---|---|
| Sand (clear, washed) pounds | 4 |
| Portland cement—type I do | 2 |
| Water quarts | 1.5 |

The solids of the mortar were mixed, as in Example I, with water at about 560 mm. Hg vacuum (gage) and the slurry was thoroughly mixed at about 70° F. while under the reduced pressure. The 5-gallon jug in which the mixing took place was sealed against the entry of air and thus maintained at about 70° F. for 35 days without agitation. The jar was then opened and the mortar inspected. It was found that the mortar was still fluid and had workable consistency. After being admixed with air the mortar set in about 6 hours to a hardened mass.

In still another embodiment of the invention the aggregate, i.e., stone and/or sand, is added to the cement-water mix after the mix has been stored under vacuum and the vacuum released.

Other forms, embodiments and applications of the invention coming within the proper scope of the appended claims will readily suggest themselves to those skilled in the art.

This application is a continuation-in-part of my co-pending U.S. Patent application, Serial No. 680,010, filed August 23, 1957, and now abandoned.

I claim:

1. A method for handling an hydraulic cementitious composition which comprises at ambient temperature forming a slurry consisting essentially of water and Portland cement, applying a vacuum to said slurry before said slurry hardens and maintaining said slurry at ambient temperature under vacuum at an absolute pressure above that at which water evaporates for a period of at least a day, whereby said slurry remains workable while maintained under vacuum.

2. The method of claim 1 including the subsequent step of releasing the vacuum and, at atmospheric pressure, mixing said slurry with air so as to permit normal hardening of said slurry.

3. A method for handling an hydraulic cementitious composition which comprises forming a slurry consisting essentially of water and Portland cement at about 50° F. to 100° F., before said slurry hardens applying thereto a vacuum within the range of from about 20 mm. Hg to about 560 mm. Hg absolute pressure, and insufficient to permit evaporation of water from said slurry, and agitating said slurry while it is maintained at about 50° F. to 100° F. under said vacuum for a period of at least a day, whereby said slurry remains workable while maintained under vacuum.

4. The method of claim 3 including the subsequent step of releasing the vacuum and, at atmospheric pressure, mixing said slurry with air so as to permit normal hardening of said slurry.

5. The method of claim 3 wherein said slurry is agitated while under vacuum by subjecting it to continuous vibration.

6. A method for handling an hydraulic cementitious composition which comprises forming a slurry consisting essentially of water and Portland cement at about 70° F., applying a vacuum of from about 60 mm. Hg to about 260 mm. Hg absolute pressure to said slurry before it hardens and agitating said slurry while it is maintained at about 70° F. under said vacuum for a period of at least a day, whereby said slurry remains workable while maintained under vacuum.

7. A method for processing neat cement paste which comprises forming a slurry consisting essentially of water and Portland cement, said slurry being further characterized by hardening into a solid mass in a few hours under atmospheric pressure, prior to the time at which said slurry loses workability applying a vacuum of about 60 mm. Hg to about 260 mm. Hg absolute pressure to said slurry at about 70° F. and storing said slurry under said vacuum at about 70° F. while agitating said slurry for a period of time, at least a day, so as to prevent temporarily said slurry from hardening, thereafter releasing the vacuum and mixing said slurry with air at atmospheric pressure so as to permit said slurry to harden.

8. The method of claim 7 wherein said water and said cement are mixed under vacuum.

9. A method for processing an hydraulic cementitious composition which comprises forming a slurry consisting essentially of water, Portland cement and aggregate, said slurry being further characterized by hardening to a solid mass in a few hours under atmospheric pressure, prior to the time at which said slurry loses workability applying a vacuum of about 60 mm. Hg to about 260 mm. Hg absolute pressure to said slurry at about 70° F. and storing said slurry at about 70° F. under said vacuum while agitating said slurry for a period of time, at least a day, so as to prevent temporarily said slurry from hardening, thereafter releasing the vacuum and mixing said slurry with air at atmospheric pressure so as to permit said slurry to harden.

10. The method of claim 9 wherein said water, cement and aggregate are mixed under vacuum.

References Cited in the file of this patent

FOREIGN PATENTS

| | | |
|---|---|---|
| 13,957 | Great Britain | of 1889 |
| 328,030 | Great Britain | Apr. 17, 1930 |

OTHER REFERENCES

Abrams: Design of Concrete Mixtures, Bulletin 1, Published October 1922, by Structural Materials Research Laboratory Lewis Inst., Chicago, Illinois, pages 3, 15.

Creskoff: "Vacuum Concrete," The Canadian Engineer, volume 77, December 5, 1939, pages 4–8, TA1.C2.

Chem. Abstracts, volume 34 (1940), item 8206.

J. Amer. Concrete Inst., volume 26, September 1954, No. 1, pages 53–59.

Lea and Desch: The Chemistry of Cement and Concrete, published 1956, Edw. Arnold, Ltd. of London (pages 339–40).

Rippon: "Vacuum Processing of Shasta Dam Spillway," Engineering News-Record, volume 134, pages 93–96, TA1.E61.